UNITED STATES PATENT OFFICE.

JUDSON A. DE CEW, OF MONTREAL, QUEBEC, CANADA.

PAPER-SIZE AND PROCESS OF MAKING SAME.

1,223,480. Specification of Letters Patent. Patented Apr. 24, 1917.

No Drawing. Application filed February 25, 1914. Serial No. 820,957.

*To all whom it may concern:*

Be it known that I, JUDSON A. DE CEW, a subject of the King of Great Britain, and resident of the city of Montreal, in the Province of Quebec and Dominion of Canada, have invented a certain new and useful Improvements in Paper-Size and Processes of Making Same, of which the following is a full, clear, and exact description.

This invention relates to a paper size and process of making same, said product consisting of a resin soap which has been made by saponification with ammonium hydrate or carbonate.

The ammonium resinate which is the product of this saponification is a distinctly new product differing in character and appearance from the resin soap made by means of sodium carbonate or caustic soda. In producing this product, I proceed preferably as follows:—

In an inclosed vessel in which an agitator is applied, the resin soap is saponified by adding an excess of ammonia above that theoretically required to give saponification. When this resin is stirred in aqueous ammonia, the saponification takes place at a comparatively low temperature, and under these conditions, a very white resinate is produced, no coloring matter being formed by the chemical action of saponification. This saponification can be accelerated by applying heat, but in such a condition the product should be in a closed tank, which would not permit the escape of ammonia gas. A gas pressure would thus be maintained in the cooker during saponification. The gas would again condense when the product was allowed to cool.

High pressure may be used in the saponifying process, but it is found that when a high temperature is used, a darker soap is produced. Thus, where it is desirable to have the resin soap of the lightest color lower temperatures should be used in saponification.

Ammonium resinate has never to my knowledge been used directly as a sizing agent for paper, although some sizing products may have been made in which small quantities of ammonium resinate were supposed to be present, although it is doubtful if any advantages would have been derived from the use of ammonium resinate in this way. One of the reasons why ammonium resinate has not been used is the difficulty in diluting it and keeping the ammonia combined with the resin without separation, in other words, to prevent the liberation of free resin and the evaporation of ammonia.

I have devised a method for overcoming this difficulty, which method consists of blowing the size under pressure through special apertures or other apparatus into a cold water solution, this process being fully described in my application, Ser. No. 820,373. Further, the advantages of ammonium resinate as a sizing material do not appear to have been known or appreciated, and no attempt to produce or use the material appears to have been made. I have found that the ammonium resinate can be made readily in cold or warm water solutions, and that the product has a better color and improved quality in that the aqueous solution has much greater viscosity than other resinates, such as those made by soda or potash. Ammonium resinate solution has the appearance of a colloid such as glue, and it sets in almost the same way.

I have also discovered that this product has many advantages over other soaps for sizing paper. A sodium resinate before it can become effective as a sizing agent must be precipitated into the paper stock by means of a solution of alum, and in order that this precipitation may be completed and all the sodium resinate utilized, it is necessary to add a large excess of alum solution. Otherwise, certain portions of sodium resinate might remain, which would injure the sizing effect. By using ammonium resinate as a size, I am able to practically eliminate the use of sulfate of aluminum as a sizing material. This can be shown by an experiment such as dipping a piece of unsized paper into a solution of ammonium resinate, and drying same by means of heat. It will be found that the ammonium resinate has been entirely decomposed and that only resin remains, the paper being thoroughly resistant to water and heat. This shows that for the purpose of top sizing, sulfate of aluminum or alum is quite unnecessary in producing the sizing effect. When this size is used in the beating engine, it is possible that some of it might be lost in the waste water if no alum whatever was used, as the ammonia would not escape completely during the beating process. The amount of alum necessary would be only about one-sixth of that which is used in general, and only enough to supply the chemical equivalent of the ammonia left in the size. The sizing effect can be obtained by my process with practically no acid in the paper, and this is very desirable in papers where great pliability is required. For high grade white papers where discoloration by resin size is noticeable, the cold made size has great advantages, as no discoloration is produced by means of the resin soap when suitable grades of resin are used. This product can also be combined with starch, glue or other various fillers for use as a top sizing for paper, and may have various other applications on account of its colloidal and viscous character.

As an engine size, the chief value of this product is in the fact that the ammonium resinate decomposes readily with the heat on the driers, and any of the alkali carried forward into the paper through incomplete chemical reactions in the beating engine is entirely driven off from the heat of the paper machine, and the sizing effect obtainable from the free resin is completed.

It will be evident that should this resin soap contain an alkali such as potash or soda in any material quantity, this advantage would not be fully obtained, and the incorporation of sodium resinate into this produit would lessen its value in proportion to the amount of sodium resinate used. One of the results of mixing this product with sodium resinate as a size would be that the proportion of alum would have to be increased proportionately. In a product substantially all sodium resinate, but containing a small amount of ammonium resinate, it would be necessary to add a considerable excess of alum in sizing, and all the ammonia would be converted to ammonium sulfate before the paper stock reached the machine, and there would be no ammonium resinate left to be affected by the heat from the drying cylinders. This product should therefore be chiefly resinate of ammonium for the purpose of waterproofing fibers and textiles. The product may also be compounded with oils, fats or waxes in various proportions, or with ammonia soaps, the effect of the latter being to soften the product and make it more pliable.

The use of this product is not limited to the manufacture of paper, but may be used in the manufacture of waterproofing materials such as textiles, yarns, leather, wood products, etc., and acts in the same manner as a water soluble varnish. It may be used to coat various objects, the result being that on drying, the ammonia leaves the product and it is no longer water soluble, but is provided with a coating composed of resin or resin compounds with oils, fats or waxes. For this purpose, various fillers may also be incorporated.

Having thus described my invention, what I claim is:—

1. A product consisting of a cold size solution containing a non-decomposing resinate of ammonia, free ammonium hydrate and water without the presence of free rosin.

2. A process for making a size solution containing resinate of ammonia, free ammonium hydrate and water from a cold thick size, consisting of, forcing the cool size by means of pressure applied thereto, into a cold aqueous solution.

In witness whereof, I have hereunto set my hand, in the presence of two witnesses.

JUDSON A. DE CEW.

Witnesses:
C. W. TAYLOR,
G. M. MORELAND.